3,259,465
CHEMICAL ANALYSIS AND PROCESS CONTROL BY SOLID FILAMENT REAGENT
Robert T. Sheen, St. Petersburg, Fla., assignor to Milton Roy Company, Philadelphia, Pa., a corporation of Pennsylvania
Filed Feb. 6, 1963, Ser. No. 256,742
6 Claims. (Cl. 23—253)

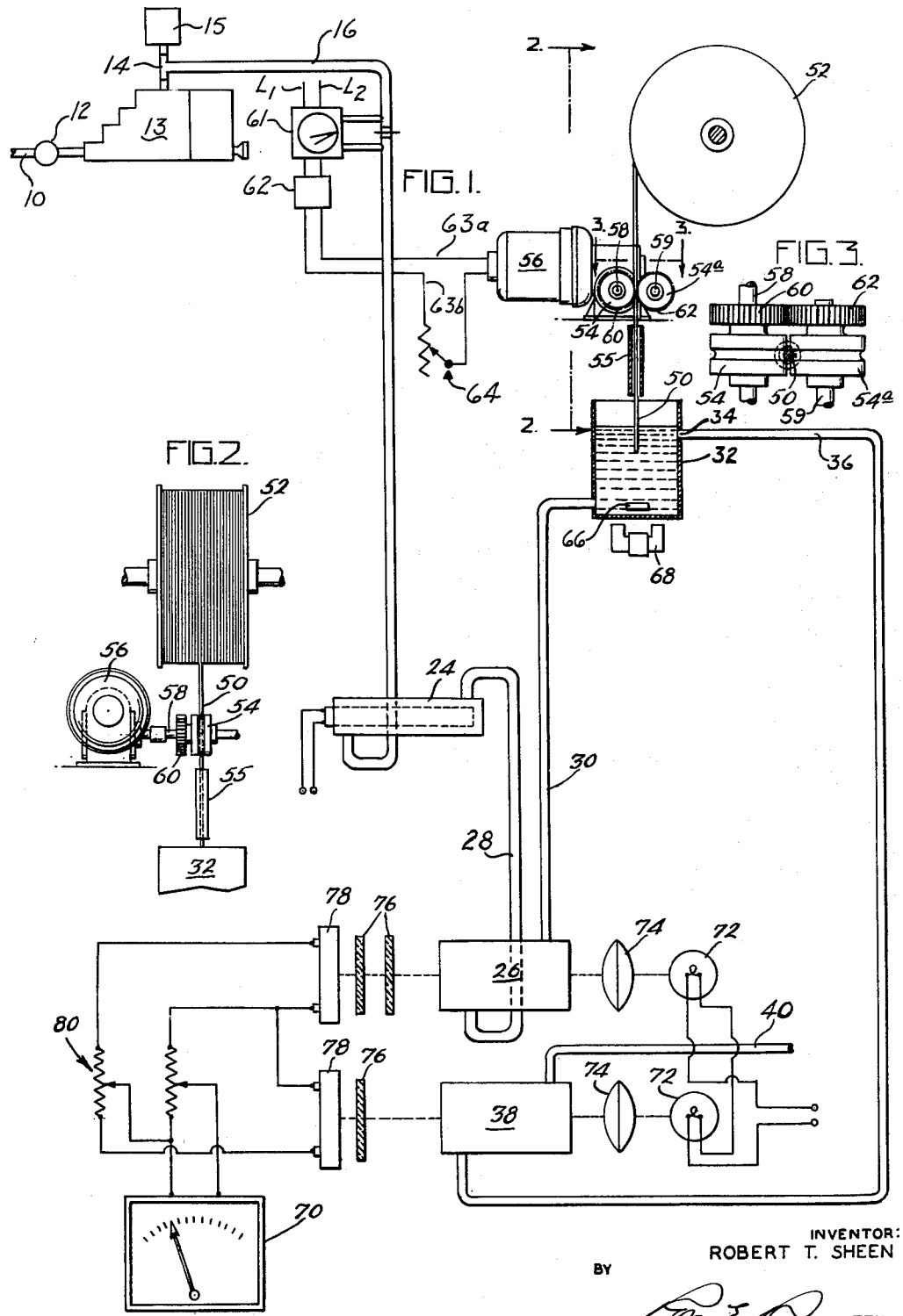

This application is a continuation-in-part of my co-pending application Serial No. 33,577, filed June 2, 1960 and now abandoned, for Chemical Analysis and Process Control by Solid Filament Reagent.

The present invention relates broadly to a system and apparatus adapted for analysis of fluids for determining chemical components or constituents therein, and also for process control, and more particularly to improvements in such a system and apparatus wherein a fluid-soluble continuous reagent filament is selectively immersed in a sample fluid where chemical components of the fluid are to be determined by analysis or process control by addition of reagent or chemical to process streams and the like.

While the invention will be described in detail hereinafter as regards a colorimetric analysis, this is merely illustrative of one use of the invention. As another example of variations contemplated, by the addition of solid reagent tapes or the like, it is possible to introduce acids or alkalies, and determine the results of an analysis electrometrically or for process control in numerous applications. The invention accordingly broadly teaches a method and apparatus for the addition to fluids of solid fluid-soluble tapes containing chemical reagents.

For analytical purposes results can be determined by various types of analysis including for example, but not limited thereto, colorimetric, eletrochemical electrometrically, conductivity, and direct measurement of pH before and after addition of tape, temperature change and Redox measurement.

The invention is also applicable for continuous titration of liquids and other applications where it is desired to introduce chemicals to liquids wherein the chemicals are contained in solid fluid-soluble reagent tapes or filaments such as for process control.

The following description which deals specifically with using the invention for colorimetrically analyzing fluids is, as pointed out hereinbefore, for illustrative purposes only since it will be apparent that the invention is much broader in concept. Apparatus and systems for colorimetrically analyzing fluids are utilized to test, for example, hardness of water for different applications, and presence and amounts of other components, such as silica, phosphate and chlorine in fluids. The process of an analyzing system and apparatus contemplated by the present invention consists generally of the steps of introducing and passing a sample fluid through the reaction vessel, controlling flow of the sample fluid through the reaction vessel, and selectively feeding a solid fluid-soluble continuous reagent filament into the reaction vessel in contact with the sample fluid therein. The fluid dissolves the filament and thereafter the fluid is analyzed for the constituent or component sought by means of a photoelectric comparator, for example, wherein the light transmission property or characteristic of the sample fluid is compared with the light transmission property or characteristic of the fluid from the reaction vessel and through a meter properly set and calibrated in a known manner the amount of component or constituent sought is determined.

In accordance with the present invention the reagent is dispersed in a fluid-soluble substance such as a plastic material which may be extruded in the form of a filament having a circular cross-section. Further, the invention contemplates controlling or regulating flow of the sample fluid through the system and the rate of introduction of the reagent to the reaction vessel in a manner to give an accurate and precise determination of the amount of constituent or component sought. Further, means can be provided for heating the sample fluid prior to passage through the reaction vessel thereby providing a system wherein the temperature of the sample fluid in the system can be maintained at the proper level. This provides for acceleration of the reaction and also substantially uniform dissolution of the reagent filament in the reaction vessel. Further, the apparatus and system of the present invention comprise comparatively few moving parts which can be constructed rather economically.

The use of a continuous solid fluid-soluble filament as taught by the present invention permits long operation without the necessity of replacing the reagent source with a consequent labor saving and lack of necessity for frequent checking of the apparatus.

Other features and advantages of the present invention will be more readily apparent from the following detailed description of an embodiment thereof when taken together with the accompanying drawings, in which FIG. 1 is a schematic illustration of an embodiment of a colorimetric analyzing system utilizing the teachings of the present invention;

FIG. 2 is a sectional view taken along line 2—2 of FIG. 1, showing the continuous reagent filament and the means for regulating feed of the filament to the reaction vessel; and FIG. 3 is a sectional view taken along line 3—3 of FIG. 1, showing the reagent filament feed rolls.

Referring now in detail to the drawings, an embodiment of apparatus and system in accordance with the present invention is illustrated in FIG. 1, and comprises an inlet conduit 10 through which sample fluid is by-passed from the mainflow to the system, and a valve 12 for regulating flow of the fluid into a variable volume pump 13, which may be like to that shown in U.S. Patent 2,892,532, and which may be regulated to provide a relatively constant flow at the desired rate. Pump 13 discharges through pipe 14 into a pressure tank 15, which maintains a constant pressure on the liquid in pipe 14, and a pipe 16 connected therewith and leading to a heating chamber 24, the purpose of which will be discussed hereinafter. The heating chamber 24 communicates with a blank cell 26 by means of a conduit 28. Flow line 30 disposed at the upper portion of cell 26 connects the blank cell with a reaction vessel 32 which has a liquid discharge port 34 at its lower end to which is connected a conduit 36 for linking the reaction vessel 32 with a sample cell 38. The sample cell discharges to waste through conduit 40.

In accordance with the present invention means are provided for feeding a solid fluid-soluble continuous reagent filament 50 to the reaction vessel 32 at a rate automatically varied to maintain a given correlation between the rate of flow of fluid to the reaction vessel and the rate of feed of the solid reagent. The filament is formed by dispersing reagent in a soluble plastic for example, which is then extruded in the form of a filament. The filament of the invention can be varied as to constituents and composition. The carrier can be such that in addition to being water-soluble, it can be soluble in alcohol, petroleum and other fluids. For water-soluble filaments the carrier could consist principally of a polyvinyl alcohol (pva), a polyvinylpyrrolidone (pvp), dextran starch, carboxymethyl cellulose (cellulose gum), hydroxyethyl cellulose (natrosol), ethylene-oxide (polyox), alginate and others which are known to those skilled in the art.

An example of a typical formulation of the filament for use in determination of hardness in water is as follows:

4% eriochrome black T
10% magneseum desodium EDTA
4% triethanolamine
4% monoethanolamine
4% concentrated hydrochloric acid
3% purified water
61% polyvinylalcohol (Dupont "Elvanol" 51–05)
10% sodium carbonate (anhydrous powder) to be added last The filament shown in the drawings is of a circular cross-section. It is to be understood that other forms providing for different shaped cross-sections could be used within the scope of the present invention. To this end a spool 52 about which the filament is wound is provided which is rotatably mounted so that the filament may be readily drawn off from the spool. The filament passes downwardly through a pair of filament feed rolls, 54, 54a and a guide 55 disposed below the feed rolls and thence into the reaction vessel. Drive means are provided operatively connected to the feed rolls, 54, 54a which operate to feed the filament to the reaction vessel at a predetermined rate. As shown in FIG. 2 the drive means comprises a motor 56 having a drive shaft 58 which mounts at its outer end one of the feed rolls 54. Feed roll 54a is mounted on a shaft 59 which is positioned parallel to the drive shaft 58. The feed rolls are interconnected by means of a pair of meshing gears, a driver gear 60 mounted on shaft 58 and a driven gear 62 mounted on the driven shaft 59. Motor 56 is a variable speed motor and its speed is controlled according to the rate of flow of liquid through pipe 16 by a speed regulator 61 which is responsive to variations in pressure at opposite sides of a restriction 61a in pipe 16 to operate a potentiometer 62 and thereby control the current flow from a D.C. source L1, L2 to motor 56 through wires 63a and 63b. Such rate of flow responsive controllers are well known commercially available devices and for sake of simplicity the details are not shown. As the flow of fluid through pipe 16 increases, the speed of motor 56 is increased, and vice versa. Preferably, the speed of the motor can be set by a manually operable potentiometer 64 according to the requirements of the particular reactions involved.

In operation, the sample fluid passes through the inlet pipe 10 and through the valve 12 and is pumped to pressure tank 15 and pipe 16 by pump 13. The apparatus shown and described is one way in which to control the flow of the liquid but of course other types of mechanisms or methods can be used.

The sample fluid flows through pipe 16 into the heating chamber 24. In the heating chamber the temperature of the fluid to be tested is raised, if necessary, in order to accelerate the solution of the soluble reagent filament and also to insure that the solution of the filament in the liquid is constant for a predetermined flow through the reaction vessel. The heated fluid then passes through the blank cell and through the conduit 30 into the reaction vessel 32, where reagent from the soluble filament is dissolved in the sample fluid. In order to insure the proper and thorough mixing of the sample fluid with reagent in the filament, agitation means are provided which in the embodiment shown includes a permanent magnet reagent mixing bar or rod 66 enclosed in glass or plastic, and which is freely movable in all directions in the reaction vessel 32. An air gap transformer 68 or the like is disposed externally of the reaction vessel 32 and has a big leakage field. When the transformer is actuated by means of A.C. current of, for example, 50 to 60 cycles the transformer will cause movement of the mixing bar, which therefore constitutes means for mixing the liquid and the reagent which has dissolved in the liquid to be tested. Obviously other fluid agitator means can be used other than the one specifically described.

The so mixed fluid passes from the mixing chamber through conduit 36 into an optical measuring chamber of sample cell 38 wherein the light transmission property of the mixed fluid is compared with that of the sample fluid in cell 26, and through an electrical system the percent or amount of chemical constituent being sought is indicated on meter 70. The fluid is then discharged through conduit 40 to waste. As noted previously, the rate of flow of the fluid through the system can be regulated by variable volume pump 13 to provide the desired flow.

The measuring system as illustrated for colorimetric analysis comprises, as shown in the lower portion of the schematic illustration of FIG. 1, for each cell 26, 38, a light source 72 and a lens 74 disposed intermediate the light source and the chambers 26 and 38. The chambers 26 and 38 are provided with transparent end portions, for example, plastic windows connecting opposite sides of the chamber so that the light may pass through the chambers. Filters 76 are provided adjacent the opposite end of said chambers, and outwardly placed with respect thereto are photo cells 78, 78. The light sources and photoelectric cells are connected in operative circuits for energization. The photo cells are so connected in a bridge-type circuit 80 and to a meter that the system can be adjusted and zeroed and render an accurate comparison of the light transmitted through the two chambers. Therefore, as noted previously, chamber 26 contains the sample fluid and chamber 38 contains the liquid after it has passed through the reaction vessel wherein it is mixed with the reagent. The reagent causes a color change in the fluid dependent upon the chemical constituent and/or amounts therein. The so mixed fluid will permit transmission of a different amount of light as compared with the fluid prior to addition of a reagent. Accordingly the amount or percent of constituent or chemical component can be determined through the photoelectric cells and the meter which can be suitably calibrated to give a direct reading in constituent amount in the fluid tested.

As pointed out hereinbefore, the present invention is useful as a system for continuous titration. An example of this would be to determine a balance point on the colorimetric scale at a given transmission of light and to vary the speed of the feed of the filament to maintain that exact transmission. For example, the tape might well contain an acid or an alkali together with an indicator, and then be fed at just that rate of speed that would be sufficient to maintain the end point of the titration. The speed of the feed would therefore be an indication of the titration value and would be continuously indicated. If more titrant were required the speed would be increased and if less titrant, the speed would be decreased.

It is also contemplated that the invention is applicable where it is desired to feed two or more reagents. This can be accomplished by feeding two filaments separately, with controlled speeds, to a single reagent chamber or the products of a first reagent chamber could be transferred to a second reagent chamber where one or more additional filaments might be added. It is also contemplated that a filament feed as described in detail can be combined with other types of reagent feed means such as that shown in U.S. Patent No. 3,028,225, entitled Chemical Analyzer, either by simultaneous reaction or reaction in series or cascade.

Accordingly, it is apparent that the system and apparatus of the present invention permit testing of fluids for chemical constituents therein without the necessity of any moving parts or valves in the liquid system. Additionally, of importance in one form of the invention, the continuous uniform and controllable filament feed combined with the controlled velocity of the fluid to be tested and heating element provide a system wherein the accurate and precise measurement of the amount of constituent in the sample fluid may be determined over a long period of operation.

The present invention is also useful for many types of process control by the addition of the solid filament type fluid-soluble reagent. Proportional control of a process stream, for example, can be accomplished by the teachings of the invention. As examples of different process controls, the following are illustrative but not to be considered as being limited thereto. The chlorination of water can be controlled by the incorporation of common chlorinating powders in the solid fluid soluble reagent tape and which could include, for example, Chloramine T. A continuous or intermittent feed of the filament or tape could be used. The chlorine content of swimming pools or water supplies, for example, can be very closely controlled in accordance with the invention.

Degassing of aluminum in the molten stage could be accomplished by incorporating hexachlorethane in any plastic tape which is not water-soluble.

Water softening agent can be selectively added to water eliminating the present use of powder feeders, for example.

Industrial waste coagulation in water supplies can be controlled by the incorporation in the filament of alum.

If desired, the rate of feed of the reagent carrying tape can be controlled by feed-back control mechanism of known types, which could control the speed of the feed motors.

The apparatus of the present invention has been only schematically shown on the drawings for the sake of simplicity and clarity. It is felt that the basic concepts and structures, however, are clearly understandable therefrom. Manifestly, many minor changes and details of construction and arrangement can be effected within the scope and spirit of the invention without departing therefrom as limited solely by the appended claims.

Having thus described my invention, I claim:

1. A system for continuous analysis of fluids for chemical constituents comprising a reaction vessel, means for introducing and passing a sample fluid through the reaction vessel, means for controlling the flow rate of the sample fluid through the reaction vessel, a fluid soluble continuous solid reagent filament in contact with the sample fluid in said reaction vessel, means for feeding the filament into said reaction vessel at selected rates, means for correlating flow of the sample fluid through the reaction vessel with the feed rate of said reagent filament, and means for determining the amount of chemical constituents in the fluid.

2. An apparatus for automatically analyzing chemical components in fluids comprising a fluid circuit for continuously circulating sample fluid to be analyzed, said circuit including in the direction of flow, means to apply a given head of pressure on the fluid, an optical measuring chamber, a reaction chamber, a fluid soluble continuous solid reagent filament extending into said reaction vessel in contact with the sample fluid therein, means for feeding the filament into said reaction vessel at a selected rate, means for correlating flow of the sample fluid through the reaction vessel and the rate of feed of the filament, and optical measuring means to determine the existence of constituent in said sample fluid.

3. An apparatus for automatically analyzing chemical components in fluids comprising a circuit for continuously circulating sample fluid to be analyzed, said circuit comprising in the direction of flow, means to establish a given pressure on the fluid, a first optical measuring chamber, a reaction vessel, a second optical measuring chamber, means for controlling the rate of flow through said circuit, a fluid soluble continuous solid reagent filament extending into said reaction vessel in contact with the sample fluid therein, means for feeding the filament into said reaction vessel at a selected rate, means for correlating flow of the sample fluid through the reaction vessel and the rate of feed of the filament, and optical measuring means for comparing fluid in said first optical measuring chamber with fluid in said second optical measuring chamber to determine the amount of constituent in said sample fluid by said comparison.

4. Apparatus as claimed in claim 2, and including fluid agitator means for said reaction vessel to facilitate mixing and solution.

5. Apparatus as claimed in claim 3, and a heating chamber in said circuit between the first mentioned means and the first optical measuring chamber to heat said sample fluid to a predetermined temperature.

6. Apparatus as claimed in claim 2, wherein said means for controlling feed of the filament into said reaction vessel comprises a pair of rotatably mounted feed rolls in engagement with said filament, and a variable power means adapted to drive said rolls at a selected rate.

References Cited by the Examiner

UNITED STATES PATENTS

| 1,919,858 | 7/1933 | Pettingill | 23—200 |
| 2,331,955 | 10/1943 | Beehe et al. | 229—62 |
| 2,627,453 | 2/1953 | Sheen | 23—253 |
| 2,951,689 | 9/1960 | Asp et al. | 23—259 X |
| 2,981,606 | 4/1961 | Keston | 252—408 X |

MORRIS O. WOLK, *Primary Examiner.*

JAMES H. TAYMAN, JR., *Examiner.*